United States Patent [19]

Menzel

[11] Patent Number: 4,522,041
[45] Date of Patent: Jun. 11, 1985

[54] ICE-CREAM MAKER

[75] Inventor: Waldemar Menzel, Kulmbach, Fed. Rep. of Germany

[73] Assignee: Firma Ireks Arkady GmbH, Kulmbach, Fed. Rep. of Germany

[21] Appl. No.: 102,101

[22] Filed: Dec. 7, 1979

[30] Foreign Application Priority Data

Dec. 23, 1978 [DE] Fed. Rep. of Germany ....... 2855910

[51] Int. Cl.³ ................................................ F25C 7/14
[52] U.S. Cl. ....................................... 62/342; 165/122
[58] Field of Search .......................... 62/342, 343, 406; 165/122, 140; 141/286

[56] References Cited

U.S. PATENT DOCUMENTS

| 2,504,372 | 4/1950 | Anderson | 62/406 X |
| 3,196,633 | 7/1975 | Rapazzini et al. | 62/342 |
| 3,460,590 | 8/1969 | Robbins | 141/286 X |
| 3,724,234 | 4/1973 | Garavelli . | |
| 3,802,217 | 4/1974 | Garavelli . | |
| 3,811,494 | 5/1974 | Menzel | 165/65 |
| 3,833,052 | 9/1974 | Cardinal | 165/122 X |
| 3,930,535 | 1/1976 | Menzel | 165/27 |

FOREIGN PATENT DOCUMENTS 2032003 4/1970 Fed. Rep. of Germany .
1559990 12/1976 United Kingdom .

Primary Examiner—William E. Tapolcai
Attorney, Agent, or Firm—Browdy and Neimark

[57] ABSTRACT

In an ice-cream maker comprised of a freezing tank provided with a heating system for pasteurizing its contents and of a storage container, which can be cooled and heated, the storage container is connected via at least one connecting line to the freezing tank. In order to construct such an ice-cream maker in such a way that, on the one hand, it remains possible to properly pasteurize the ice-cream mix but that, on the other hand, changes in the flavor of the ice-cream mix due to overheating or prolonged thermal loads are precluded, at least the storage container is arranged in a heating and cooling chamber.

7 Claims, 3 Drawing Figures

ICE-CREAM MAKER

BACKGROUND OF THE INVENTION

This invention relates to an ice-cream maker including a freezing tank provided with a heating system for pasteurizing its contents. The invention, more particularly, relates to such an ice-cream maker provided with a storage container for ice-cream mix which is connected, by at least one supply line, to the freezing tank.

One such ice-cream maker, known from U.S. Pat. No. 3,930,535, has a freezing tank in the form of a cylindrical housing which is surrounded by a heating jacket equipped with heating elements, as well as a cooling jacket equipped with cooling ducts. The heating system is dimensioned and controlled, in such a manner that the inside wall of the freezing tank is brought to a temperature which causes the ice cream mix in the freezing tank to partially evaporate. This vapour rises via a refill pipe into a storage container arranged above the freezing tank and heats the contents of the former to a temperature of from 70° to 80° C. (corresponding from 343° to 353° K.), which is sufficient for pasteurization. An appropriate thermostatic control ensures that the inside walls of the freezing tank do not assume a temperature which lies much above 100° C. (373° K.), in order to prevent the ice-cream mix from sticking to the inside wall of the freezing tank.

This known ice-cream maker has been extraordinarily successful in practice and, in particular, has achieved extremely good bacteriological results, that is, the ice cream has always been bacteriologically satisfactory. However, heating the contents of the storage container, arranged above the freezing tank, by means of steam generated in the freezing tank, leads to the heating-up process, that is, the pasteurization process, for pasteurizing the contents of the storage chamber, having to take a very long time, for example, one-and-a-half hours. This relatively long time has been extended still further by the fact that, as mentioned, the temperature of the heat-transmitting inner wall of the freezing tank was not allowed to exceed certain temperatures, lying not very far above the vaporization point of water, in order to prevent the ice-cream mix from sticking. Since, in addition, as a result of this slow heating up, the ice-cream mix also remains for a relatively long period in temperature ranges of from between 35° and 45° C. (corresponding to from 308° to 318° K.), in which germs will multiply particularly rapidly, the ice-cream mix had to be maintained for an especially long time at the temperature of pasteurization.

This long thermal treatment of the ice-cream mix at temperatures between from 70° and 80° C. in the storage container, and at temperatures of around 100° C., or just under in the freezing tank, however, led to changes in the flavour of the ice-cream mix (which, of course, is normally produced with a milk base). This long thermal treatment leads to a certain caramelization of the ice-cream mix, that is, to undesirable changes in flavor.

From German Offenlegungsschrift (Laid Open Patent application) No. 20 32 003 and, similarly, from German Offenlegungsschrift (Laid Open Patent application) No. 26 57 534, in each case an ice-cream maker is known in which underneath the freezing tank a separate, that is, transportable, storage container is arranged in a releasable and interchangeable manner in a cooling chamber and is connected via a flexible connecting line to a freezing tank, on the one hand, and with another flexible connecting line to a source of compressed air. The designs of these known ice-cream makers are not concerned with bacteriological problems. Constructing the storage containers as separate, releaseable and interchangeable storage containers is merely meant to make it possible to construct them as hermetically closed units so that the ice-cream mix is not contaminated bacteriologically during transport. None of the bacteriological problems occurring actually in the ice-cream maker and particularly during its operation are dealt with.

From U.S. Pat. No. 3,811,494, it is known to connect, with ice-cream makers comprising a freezing tank which is spatially separated from the storage container, both of these to one another by a forward-flow line and a return-flow line so that constant pumping is possible. The purpose of this is to prevent, on the one hand, the ice-cream mix present in the lines from warming up during a prolonged stand-still due to mix removal, and germs from multiplying as a result of this. On the other hand, this measure serves to make it possible to pasteurize also the contents of the lines during the pasteurization process and, in addition, to manage, if necessary, with only one heating system for pasteurizing the contents of the freezing tank and of the storage container and the two lines.

SUMMARY OF THE INVENTION

It is the object of the present invention to improve an ice-cream maker in such a manner that, while making it possible to obtain faultless pasteurization of the ice-cream mix, changes in the flavour of the ice-cream mix as a consequence of over-heating or of excessively prolonged heating are obviated.

According to the present invention, there is provided an ice-cream maker, including a freezing tank provided with a heating system for pasteurizing its contents, and a storage container for ice-cream mix which can be cooled and heated and which is connected via at least one supply line to the freezing tank, wherein at least the storage container is arranged in a heating and cooling chamber adapted to be heated and cooled.

The measures according to the invention cause heat to be transferred particularly well over a large area so that the ice-cream mix is heated relatively rapidly. The measures according to the invention also enable an exceptionally even temperature distribution to take place so that no local overheating occurs. The result of this is exceptionally rapid and even pasteurization, and no significant deterioration in the flavor of the ice-cream.

A particularly simple solution of the heating, on the one hand, and of the cooling, on the other hand, in the heating and cooling chamber is obtained if a heating and a cooling unit is provided in the heating and cooling chamber. The above-mentioned transfer of heat in a particularly even manner and over a large area may be improved if an air circulating unit is provided in the heating and cooling chamber. Since the heat transfer during heating, on the one hand, and during cooling, on the other hand, takes place primarily by convection; an air circulating unit brings considerable advantages.

If, the freezing tank is arranged wholly in the heating and cooling chamber, the same advantages also apply to the freezing tank. If it is arranged only partially, for example, with its inlet chamber, only, in the heating and cooling chamber, a separate heater must be provided also at the freezing tank for pastuerization purposes.

However, since it is only used for heating the contents of the freezing tank, heating can take place at a lower temperature level so that here, too, changes in the flavour of the ice-cream mix are obviated.

The storage container may be arranged in the heating and cooling chamber in a releaseable and interchangeable manner and in this case, is preferably connected to the freezing tank by flexible lines.

The storage container may be connected to the freezing tank via a forward-flow line and a return flow line and via at least one interposed supply pump. In this case, it is not necessary to pump the ice-cream mix first into the freezing tank and to draw it off again via the return-flow line; the short circuit can also be installed directly at the point of entry of the forward-flow line into the freezing tank since with this arrangement, of course, the lines run through the heating and cooling chamber and the ice-cream mix present in these chambers is thus heated and cooled directly.

In order to improve the heat transfer in the storage container on its inside, means may be provided in the storage container for causing the ice-cream mix returned to the container walls to form a film thereon. The means may comprise a distributing disc leading to the inside of the container walls.

The heat transfer on the outside of the storage containers is improved still further if a heating and cooling unit is provided inside the heating and cooling chamber.

DETAILED DESCRIPTION OF THE PREFERRED EMBODIMENTS

Figure 1:
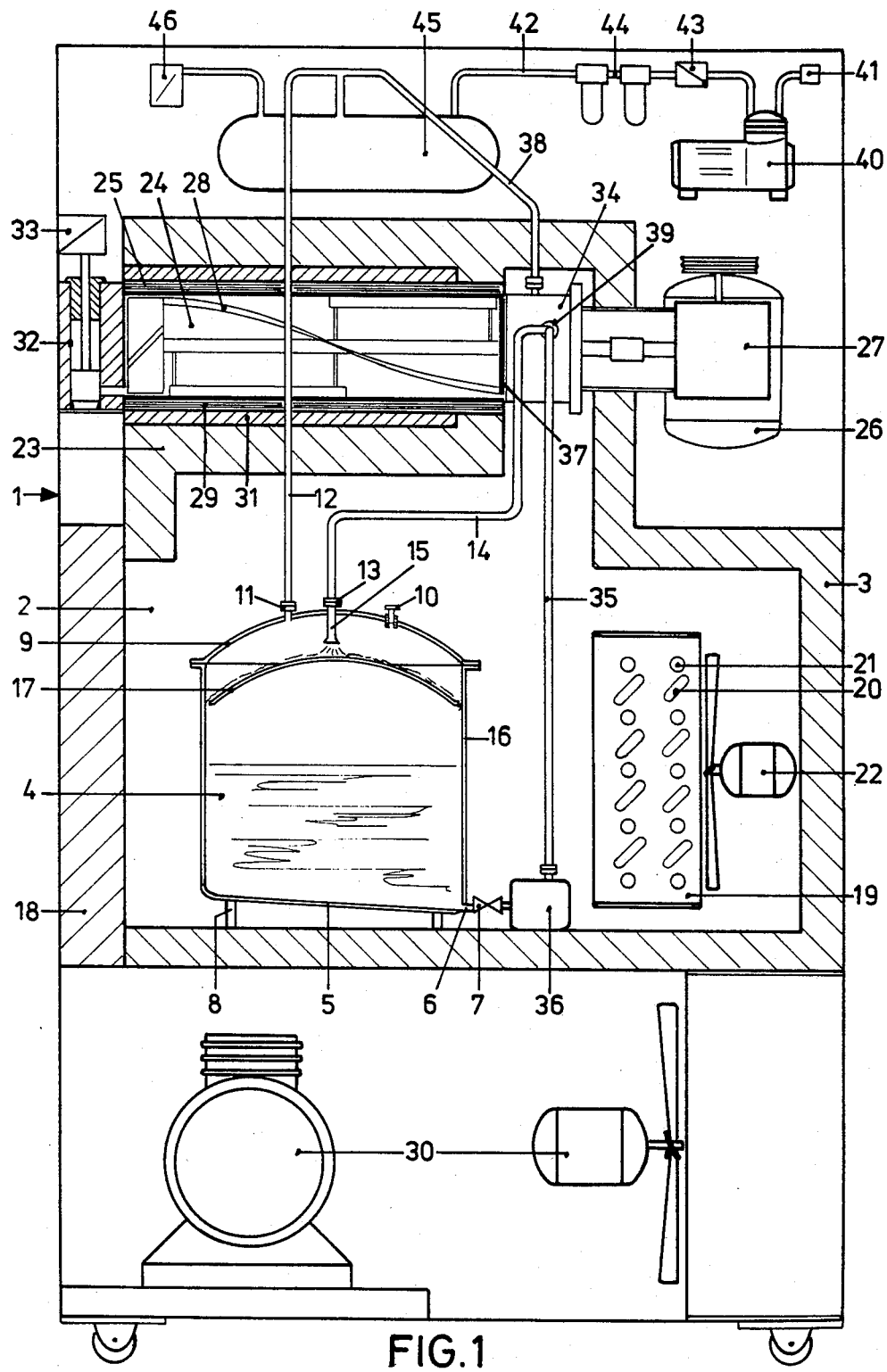
FIG. 1 shows a first, exemplary embodiment of an ice-cream maker according to the present invention, in vertical cross-section.

In the embodiment according to FIG. 1, there is shown an ice-cream maker for supplying portions of ice-cream having a housing 1 of a box-like shape. A heating and cooling chamber 2 which is surrounded by a thick wall of heat insulation 3 is arranged in the housing. The heating and cooling chamber 2 is used for accommodating one (or several) transportable storage containers 4 for an ice-cream mix with an air space around the containers. In the vicinity of a floor 5 of the storage container 4, it has an outlet 6 which can be closed by a shut-off valve 7. The outlet 6 is located at the lowest point of the storage container 4 so that it is possible to empty it completely. This is very easily possible by arranging the floor 5 in an appropriately inclined manner or by arranging the whole storage container 4 to be inclined. In addition, the floor 5 of the storage container 4 is resting freely on small supports 8 so that the floor 5, too, can have air circulating freely beneath it.

As a rule, the top of the cylindrically constructed storage container 4 is closed tightly by a cover 9. In the cover 9, a vent valve 10 is located. The cover 9 also contains a coupling 11 for connecting a compressed air line 12 to the container 4. In addition, approximately in the center of the cover 9, a further coupling 13 is located for connecting a flexible return-flow line 14 for ice-cream mix to the container. On the inside of the cover 9, a return-flow connecting tube 15 is joined to this further coupling 13 and ends a little above a distributing disc 17 which is curved so as to be inclined with respect to the walls 16 of the storage container 4.

At the front of the housing 1, a door 18 which is also heat-insulated is installed through which the storage containers 4 can be inserted into and removed from the heating and cooling chamber 2.

In addition, in the heating and cooling chamber 2, a cooling and heating unit 19 is arranged which is provided with both cooling elements 20 and heating elements 21. On one side of this cooling and heating unit 19 an air circulating unit 22 is arranged which consists, in the usual manner, of a fan driven by an electric motor. This air circulating unit 22 drives a cross-flow of air through the cooling and heating unit where it heats up at the heating elements 21 or cools off at the cooling elements 20, according to the respective mode of operation being used at any given time. This heated or cooled air then comes into direct contact with the storage container 4, to the walls 16 of which it transfers its heat or from the walls 16 of which it removes heat. The cooling elements 20 and the heating elements 21 are provided with sheet metal fins with good heat-conducting properties so that large heat-emitting surfaces are obtained.

In the upper region of the heating and cooling chamber 2, and thermally isolated from it to a large extent by an appropriate heat insulation 23, a conventional freezing tank 24 is arranged. Accordingly, it has a cylindrical housing 25 in which an agitator and scraper 28 is arranged which can be driven by a drive motor 26 with an interposed gear system 27. On the outside of the cylindrical housing 25 there is a cooling jacket 29 provided with cooling ducts which is connected to a refrigerating unit 30 arranged below the heating and cooling chamber 2 in the housing 1. In addition, this refrigerating unit 30 is also used to feed the cooling elements 20 in the cooling and heating unit 19.

The cooling jacket 29 is surrounded by a heating jacket 31 in which heating elements, not shown, are arranged.

At one end, the front end, of the cylindrical housing 25, located adjacent the front wall of the housing 1, there is a discharge nozzle 32 through which, by actuation of an actuating element 33, portions of ice-cream can be dispensed from the freezing tank 24. The other end of the cylindrical housing 25 is preceded by an inlet chamber 34 for the freezing tank 24, into which chamber a forward-flow line 35, consisting of flexible material, opens and which can be connected via an interposed feed pump 36 and the shut-off valve 7 to the outlet 6 of the storage container 4. At the point of transition from the inlet chamber 34 into the cylindrical housing 25 of the freezing tank 24, that is, into the freezing space proper, a barrier disc 37 is provided which is connected so to be rotationally fixed to the agitator and scraper 28. A compressed air line 38 also opens into the top of the inlet chamber 34. A freezing tank 24 constructed in this manner is generally known and represented and described especially in the above-mentioned U.S. Pat. No. 3,930,535.

The forward-flow line 35 opens via an ice-cream mix level control 39 into the inlet chamber 34. When the level of the ice-cream mix in the inlet chamber 34 reaches the height of this level control 39, the ice-cream mix, conveyed by the pump 36, is short-circuited and runs back into the storage container 4 via the return-flow line 14.

As can be seen from FIG. 1, the inlet chamber 34 is also located in the heating and cooling chamber 2 so that it is also heated or cooled from here.

The freezing tank 24, on the one hand, and the storage container 4, on the other hand, are supplied with compressed air by means of a motor-compressor 40 which sucks in air through a suction filter 41 and feeds the compressed air through a corresponding line 42 via a non-return valve 43 and a compressed-air dryer and sterilizer 44 into a compressed-air tank 45. From this compressed-air tank 45, the compressed air then reaches the freezing tank 24 via the line 38, and the storage container 4 via the compressed-air line 12. At the compressed-air tank 45 a pressure controller 46 is also provided in the usual manner.

The ice-cream mix in the whole machine is pasteurized is such a manner that, on the one hand, the contents of the freezing tank 24 are heated to the pasteurizing temperature by heating the cylindrical housing 25 of the freezing tank 24 by the heating jacket 31. Simultaneously, by heating the heating elements 21 in the heating and cooling unit 19 appropriately while simultaneously operating the air circulating unit 22, the air in the heating and cooling chamber is heated up to a correspondingly high temperature of more than 80° C. (353° K.).

This air circulates around the walls 16 of the storage container 4 and transfers its heat to these walls. Simultaneously, the supply pump 36 is operated which causes the ice-cream mix to be fed in a short circuit through the forward-flow line 35 and the return-flow line 14 since, due to the fact that no ice cream portions are being removed from the discharge nozzle 32, no ice cream is being fed into the freezing tank. The ice-cream mix flowing back is moved to the inside of the walls 16 by the distributing disc 17 and runs down these walls, which causes the ice-cream mix to be heated well and evenly. Since the inlet chamber 34, which is not surrounded by the heating jacket 31, is also arranged in the heating and cooling chamber 2, it also is heated in the same manner from the outside by the hot air.

The cooling or refrigerating operation takes place in such a manner that, on the one hand, the cooling jacket 29 of the freezing tank 24 is charged with refrigerant by the refrigerating unit 30. Similarly, the cooling elements 20 of the cooling and heating unit 19 are charged so that the air moved by the air circulating unit 22 is cooled down considerably. This, in turn, cools the walls 16 of the storage container 4, on the one hand, and thus its contents and, on the other hand, also the forward-flow line 35 and the return-flow line 14, as well as the inlet chamber 34. In order to achieve here, too, a particularly good heat transfer during the cooling operation, it is appropriate to allow the supply pump 36 to run constantly with corresponding excess delivery so that the contents of the storage container 4 are constantly circulated in such a manner that the excess return flow runs over the distributing disc 17 down the inside of the walls 16.

Figure 2:
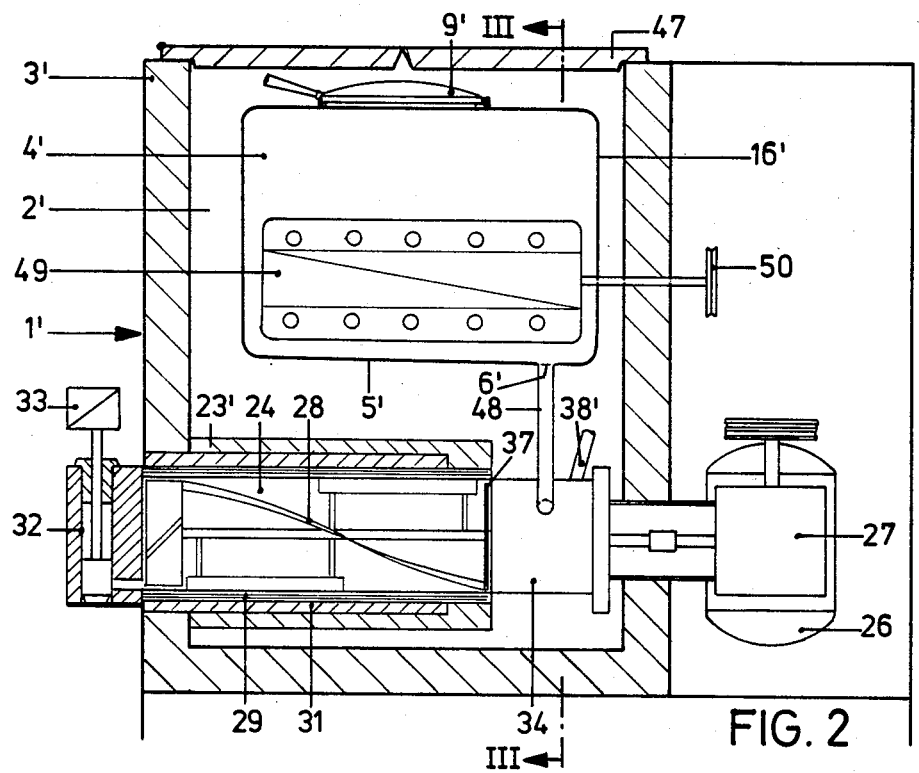
FIG. 2 is a partial, vertical, cross-sectional view of a second exemplary embodiment of an ice-cream maker according to the invention, the section being taken along section line II—II of FIG. 3.
Figure 3:
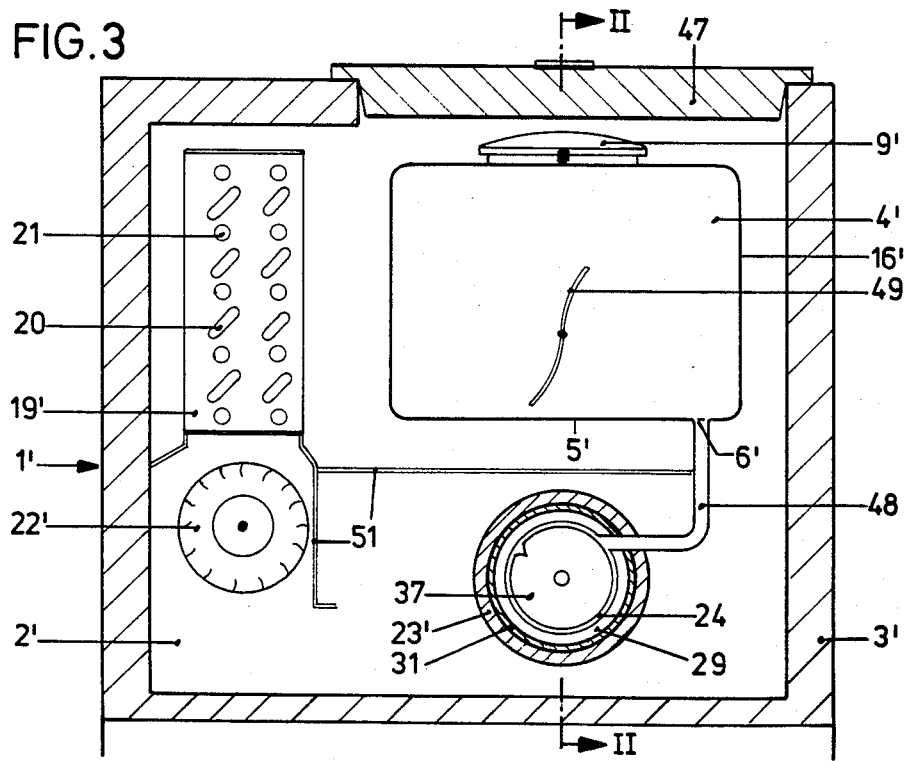
FIG. 3 is a partial, vertical, cross-sectional view of the modified ice-cream maker of FIG. 2, the section being taken along section line III—III of FIG. 2.

Since the construction and function of the illustrative second embodiment according to FIGS. 2 and 3 are quite similar to those of that according to FIG. 1, in FIGS. 2 and 3, structurally identical parts have been provided with the same reference numerals as those used in FIG. 1 so that explanations can be dispensed with in this respect. Functionally identical, but structurally somewhat different parts are designated by the corresponding reference numeral, supplemented by a superscripted apostrophe (').

The main difference between the embodiment according to FIGS. 2 and 3 and the embodiment according to FIG. 1 consists in that the storage container 4', as is largely customary, is arranged outside the freezing tank 24 and cannot be taken out of the housing 1'. In this arrangement, the top of the housing 1' is provided with housing cover 47 which is well heat-insulated and which closes the heating and cooling chamber 2' at this place, and after the removal of which the cover 9' of the storage container 4' is accessible.

In this second embodiment, the freezing tank 24 is arranged completely in the heating and cooling chamber 2' and is provided only in the area of the cylindrical housing 25, which is surrounded by the cooling jacket 29 and the heating jacket 31, with a relatively thin heat insulation layer 23'. This layer 23' prevents too rapid and too great temperature variations from taking place in the interior of the freezing tank 24 during the cooling operation without significantly retarding the passage of heat during the pasteurizing process by virtue of the heated air blown against the tank.

The ice-cream mix is fed from the outlet 6' in the floor 5' of the storage container 4' to the inlet chamber 34 via a refilling line 48 which opens into the inlet chamber below its top so that in this way, too, the ice-cream level in the inlet chamber, and thus in the freezing tank 24, is controlled in the usual known manner. Since in this embodiment no supply pump and no corresponding repumping of the ice-cream mix is provided for, in the storage container 4' an agitator 49 is provided which can be driven from the outside, via a conventional pulley 50 by a drive system, not shown.

The cooling and heating unit 19' is also again preceded by an air circulating unit 22' which is associated with air guide vanes 51 in order to ensure that the air cooled or heated, respectively, in the cooling and heating unit 19' first circulates around the walls 16' of the storage container 4' including the cover 9' and the floor 5', and only then gets back to the air circulation unit 22' in the circuit past the freezing tank 24.

Below the heating and cooling chamber 2' a refrigerating unit will be provided in the housing 1'. In this case the compressed-air supply will also be arranged in the lower part of the housing 1'. In FIG. 2 only the compressed-air line 38', leading to the inlet chamber 34 is indicated.

It is, of course, possible to provide a repumping system as described in the first embodiment in the embodiment according to FIGS. 2 and 3.

It is to be appreciated that the foregoing description and the accompanying illustration relate to embodiments given, not by way of limitation, but by way of example. Numerous other embodiments and variants are possible without departing from the spirit and scope of the present invention, its scope being defined by the appended claims.

It will be obvious to those skilled in the art that various changes may be made without departing from the scope of the invention and the invention is not to be considered limited to what is shown in the drawings and described in the specification.

What is claimed is:

1. An ice-cream maker, comprising:
a freezing tank provided with a heating system for pasteurizing its contents;

at least one storage container for ice-cream mix which can be cooled and heated;

a forward flow line and a return-flow line coupling said at least one storage container and said freezing tank via at least one interposed supply pump;

distributing means in said at least one storage container for causing ice-cream mix returned thereto via said return-flow line to flow down at least one inside wall of said storage container to form a film, said distributing means comprising a distributing disc, said disc being a separate unit disposed below the mouth of said return-flow line and not connected to said return-flow line, and said disc leading to said at least one inside wall;

a heating and cooling chamber adapted to be selectively heated and cooled, said at least one storage container being arranged in said heating and cooling chamber, free on all sides so that it can be washed by air all around, a heating and cooling unit and an air circulating unit being disposed in said heating and cooling chamber, so that the air circulating unit blows either heated or cooled air directly on the storage container.

2. An ice-cream maker according to claim 1, wherein said freezing tank is arranged at least partially in said heating and cooling chamber.

3. An ice-cream maker according to claim 1, wherein said storage container is arranged in a releasable and interchangeable manner in said heating and cooling chamber.

4. An ice-cream maker according to claim 3, wherein said at least one storage container is connected to said freezing tank by flexible lines.

5. An ice-cream maker according to claim 1 wherein said cooling and heating unit and an air circulation unit are associated with at least one air guide vane.

6. An ice-cream maker according to claim 1, including a heating and cooling unit, said heating and cooling unit being associated with at least one air guide vane.

7. An ice-cream maker according to claim 1, including an air circulation unit associated with at least one air guide vane.

* * * * *